United States Patent [19]

Katsumata

[11] Patent Number: 4,726,749

[45] Date of Patent: Feb. 23, 1988

[54] SPLIT VULCANIZING DIE

[75] Inventor: Shiro Katsumata, Tokyo, Japan

[73] Assignee: Bridgestone Corporation, Tokyo, Japan

[21] Appl. No.: 898,161

[22] Filed: Aug. 18, 1986

[30] Foreign Application Priority Data

Aug. 28, 1985 [JP] Japan .................... 60-189003

[51] Int. Cl.$^4$ ............................ B29C 35/00
[52] U.S. Cl. ........................ 425/47; 425/54; 425/56
[58] Field of Search ............... 425/28 R, 39, 40, 47, 425/54, 56

[56] References Cited

U.S. PATENT DOCUMENTS

| Re. 27,513 | 10/1972 | Pacciarini et al. | 425/39 |
|---|---|---|---|
| 3,782,871 | 1/1974 | Turk | 425/54 |
| 3,897,181 | 7/1975 | Madaschefsky | 425/39 |
| 3,901,632 | 8/1975 | Prosdocimi | 425/39 |
| 3,910,735 | 10/1975 | Caretta | 425/40 |
| 4,515,541 | 5/1985 | Salvadori | 425/40 |
| 4,580,959 | 4/1986 | Pissorno et al. | 425/28 R |

Primary Examiner—Willard E. Hoag
Attorney, Agent, or Firm—Sughrue, Mion, Zinn, Macpeak & Seas

[57] ABSTRACT

A split vulcanizing die comprising lower and upper molding rings with the upper ring movable relative to the lower molding ring. A side molding ring composed of a plurality of arc-shaped segments is movable in the radial direction of the die, so that when all the segments are moved to their radially innermost positions, the side molding ring is placed in tight contact with the outside circumferential surfaces of the upper and lower molding rings moved toward each other. An outer ring having an inside circumferential truncated-cone-shaped surface is provided outside the side molding ring so that said outer ring can be moved in the axial direction of said die. Oblique dovetail couplings conjoin the segments to the outer ring. The oblique planar surfaces are provided on the circumferential outside of the segments. Intermediate blocks corresponding to the segments removably attached to the truncated-cone-shaped surface of the outer ring and the inside surfaces of the intermediate blocks are planar surfaces which are placed in slip contact with planar surfaces which face the blocks.

9 Claims, 5 Drawing Figures

SPLIT VULCANIZING DIE

BACKGROUND OF THE INVENTION

This invention relates to a die which is split into three sections in the axial direction of the die and used to vulcanize a tire or other elastomeric articles.

A conventional split vulcanizing die is described in the Japanese Patent Application (OPI) No. 78711/85 (the term "OPI" is used herein means an "unexamined published application"). In this conventional die, the inside circumferential surface of an outer ring for moving a number of segments is shaped as a truncated cone, and the outside circumferential surface of each of the segments is shaped as a truncated cone having the same taper as the former. When the outer ring is pushed in to move the segments inwards in the radial direction of the die into contact with an upper and a lower molding ring, the truncated-cone-shaped circumferential surfaces of the outer ring and each of the segments are brought into complete surface contact with each other.

When the outer ring is pulled away from the segments in the axial direction of the die, to move the segments outwards in the radial direction of the die, a gap is created between the truncated-cone-shaped circumferential surface of the outer ring and both the circumferential ends of each of the the segments. This occurs because the radius of curvature of each of the truncated-cone-shaped circumferential surfaces of the outer ring and the segments varies in the axial direction of the die. Hence, the outer ring and each of the segments come into line contact with each other. Because of this line contact, the outer ring and the segments undergo local wear and the posture of each of the segments deteriorates, so that smooth operation cannot be attained.

In order to solve such a problem, another known split vulcanizing die described in the Japanese Patent Application No. 28295/71 has been proposed. In this die, a plurality of cam blocks are fitted to the inside circumferential surface of an outer cylindrical ring. The inside of the cam blocks is provided with oblique planar surfaces of the same gradient as each other. The circumferential outsides of segments are provided with oblique planar surfaces of the same gradient as those of the cam blocks, and the oblique planar surfaces of the cam blocks and the segments are located in slip contact with each other. However, when the segments are pushed onto upper and lower molding rings, a high shearing force acts between the outer ring and each of the cam blocks. If the cam blocks are joined to the outer ring by bolts, a deviation is caused between the outer ring and each cam block. This tends to deteriorate the dimensional accuracy of the die or in extreme cases, the bolts are broken. In order to solve such a problem, the cam blocks could be firmly joined to the outer ring by welding, but the inside surfaces of the cam blocks would require difficult cutting after the welding. For that reason, this die has not been put into practical use.

In order to solve the above-mentioned problems, still another conventional split vulcanizing die has been proposed. In this die, illustrated in FIG. 1, the circumferential inside of an outer ring 61 is provided with a plurality of recesses 62 at equiangular intervals in the circumferential direction of the die. The bottom of each of the recesses 62 in an oblique planar surface 63 and segments 64 are inserted into the recesses 62. The circumferential outsides of the segments 64 are provided with flat surfaces 65 which are placed in slip contact with the oblique flat surfaces 63. However, since the recesses 62 are provided in the inside circumferential surface of the outer ring 61, the cost of processing of the die to achieve the required accuracy is high.

SUMMARY OF THE INVENTION

This invention was made in consideration of the above-identified problems of conventional split vulcanizing dies.

Accordingly, it is an object of this invention to provide a split vulcanizing die to solve the problems in the prior art systems. In the die of this invention, the circumferential outsides of segments are provided with oblique planar surfaces, intermediate blocks corresponding to the segments are removably fitted to the truncated-cone-shaped surface of an outer ring, and the inside surfaces of the intermediate blocks are planar surfaces which are placed in slip contact with planar surfaces which face them.

When, for example, an elastomeric article such as a tire is to be vulcanized in the die, the tire is first placed on a lower molding ring, and an upper molding ring is then moved toward the lower molding ring. The outer ring is thereafter moved in the axial direction of the die so that the segments constituting a side molding ring joined to the outer ring by oblique dovetail couplings are moved inwards in the radial direction of the die by a wedge action. Then since the planar surfaces of the segments are always in slip contact with the slip contact surfaces of the intermediate blocks, the segments are smoothly moved while maintaining an unchanged geometric relationship. During the inward movement of the segments, a shearing force acts between the outer ring and each intermediate block in the oblique direction of the truncated-cone-shaped surface of the outer ring. However, the frictional forces between the truncated-cone-shaped surfaces of the outer ring and each intermediate block counters the shearing force so that the shearing force never or insignificantly acts to bind the outer ring and the intermediate block to each other. For that reason, the conjoining of the outer ring and the intermediate block to each other is maintained at a high level of accuracy. After the side molding ring is brought into tight contact with the upper and lower molding rings to define a vulcanizing cavity, the tire is vulcanized. Since the intermediate blocks are removably fitted to the truncated-cone-shaped surface of the outer ring, it is easy and inexpensive to provide each intermediate block with a slip-contact planar surface. Any wear of the slip-contact planar surface of each intemediate block can be dealt with by merely replacing the block with a new one. According to the present invention, a split vulcanizing die of high accuracy and smooth operation is inexpensively manufactured.

DETAILED DESCRIPTION OF EXEMPLARY EMBODIMENT

A split vulcanizing die, which is a preferred embodiment of the present invention, is hereafter described with reference to the drawings.

Figure 1:
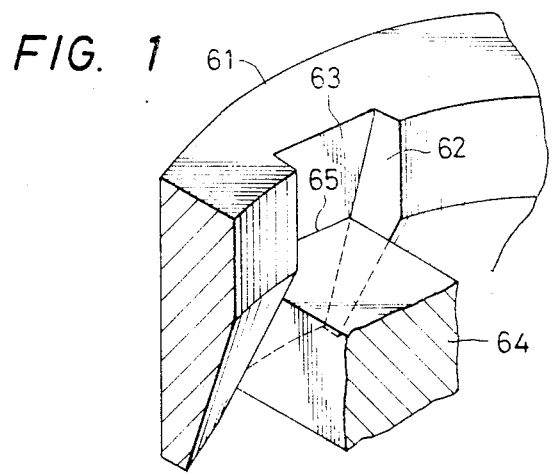
FIG. 1 illustrates a perspective view of an outer ring and the vicinity thereof in a conventional split vulcanizing die.
Figure 2:
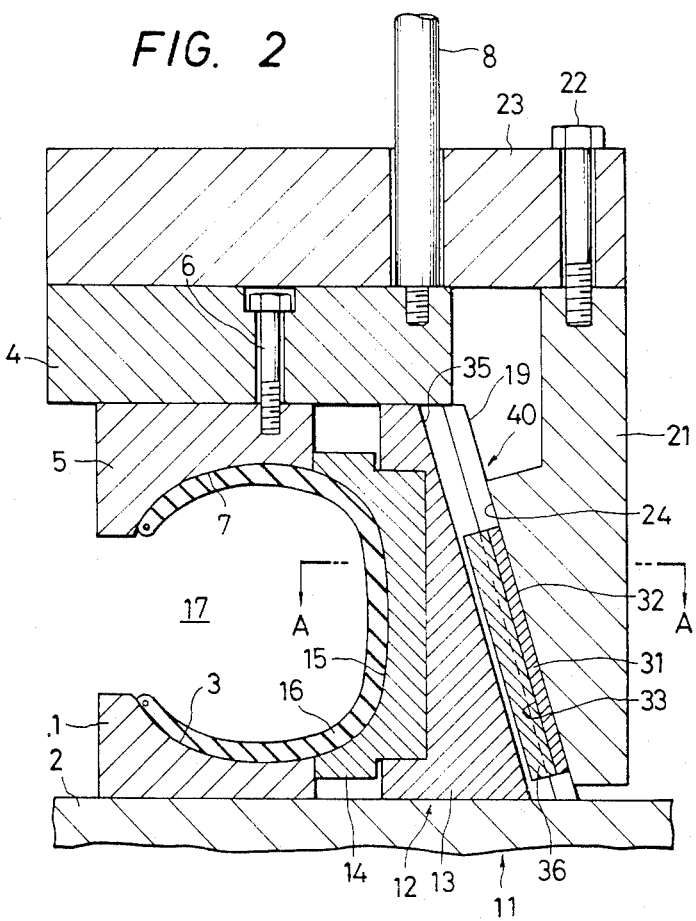
FIG. 2 illustrates a sectional view of an embodiment of the present invention.
Figure 3:
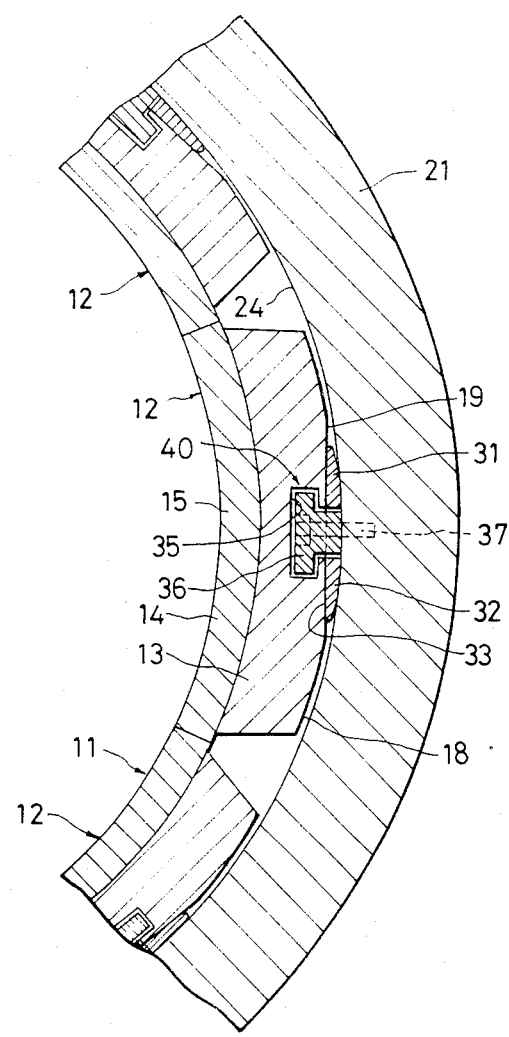
FIG. 3 illustrates a sectional view seen along arrows shown in FIG. 2.

FIGS. 2 and 3 illustrate a lower molding ring 1 secured to a lower platen 1 and provided with a molding recess 3 on the top of the ring 1. An upper platen 4 is provided over the lower platen 2. An upper molding ring 5 is attached to the bottom of the upper platen 4 by a plurality of bolts 6. A molding recess 7 is provided on the bottom of the upper molding ring 5. A vertical cylinder, not shown in the drawings, is installed over the upper platen 4. The tip of the piston rod 8 of the cylinder is coupled to the upper plate 4. The cylinder is operated to move the upper molding ring 5 up or down toward or away from the lower molding ring 1. A side molding ring 11 is provided outside the lower and upper molding rings 1 and 5 in the radial direction of the die. The side molding ring 11 is composed of a plurality of arc-shaped segments 12 whose number is set at, for example, nine, and which are continuously placed in the circumferential direction of the ring 11. Each of the segments 12 is composed of a slider 13 and an arc-shaped molding member 14 secured to the radially inner surface of the slider 13. A molding recess 15 is defined on the radially inner surface of the arc-shaped molding member 14. The segments 12 can be moved in the radial direction of the die. When all of the segments 12 are moved to their radially innermost positions so that the segments are placed in tight contact with the outside circumferential surfaces of the lower and the upper molding rings 1 and 5, an annular vulcanizing cavity 17 for vulcanizing a tire 16 is defined by the lower, upper and side molding rings 1, 5 and 11. The molding recesses 3, 7 and 15 are placed continuously to each other to constitute a molding surface for regulating the outer form of the tire 16. Each slider 13 has a radially outer truncated-cone-shaped surface 18 which is upwardly tapered.

A planar surface 19 oblique at the same gradient as the truncated-cone-shaped surface 18 and extending in the axial direction of the die is provided in the circumferential central portion of the truncated-cone-shaped surface 18. An outer ring 21 is provided outside the molding ring 11 in the radial direction of the die and attached to a bolster plate 23 by a plurality of bolts 22. The bolster plate 23 is moved up and down by a vertical movement mechanism not shown in the drawings, so that the outer ring 21 is moved in the axial direction of the die. The circumferential inside of the outer ring 21 has a truncated-cone-shaped surface 24 of the same gradient as the truncated-cone-shaped surface 18.

Figure 5:
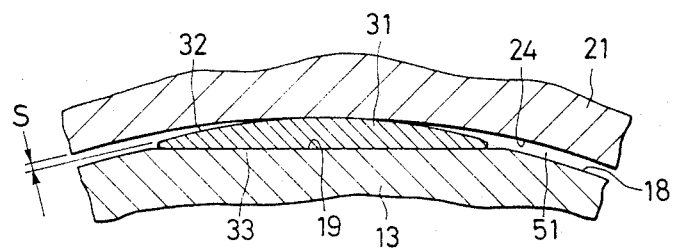
FIG. 5 illustrates a sectional view of the intermediate block and the vicinity thereof.

A plurality of intermediate blocks 31 each made of a copper alloy or the like and having a thin tapered cross section are provided on the truncated-cone-shaped surface 24 of the outer ring 21 and located on the planar surfaces 19 of the sliders 13. The thickness of each of the intermediate blocks 31 is unchanged in the axial direction of the die. The outer surface 32 of each intermediate block 31 is shaped as a portion of a cylindrical surface, the radius of curvature of which is unchanged in the axial direction of the die. It is preferred that for tight contact, the outer surface 32 of each intermediate block 31 be shaped as a portion of a truncated-cone-shaped surface of the same gradient as the truncated-cone-shaped surface 24 of the outer ring 21. However, since the gap s (refer to FIG. 5) between the truncated-cone-shaped surface 24 and each circumferential end of the intermediate block 31 is normally 0.2 mm or less, the block 31 has little "play" associated with it. For that reason, it is preferable that each intermediate block 31 is shaped as described above, for the purpose of easier processing of the block.

The inner surface of each intermediate block 31 is an oblique planar surface 33 which is parallel with the planar surface 19 of the corresponding slider 13 and is in surface slip contact with the corresponding planar surface 19. The planar surface 19 of each slider 13 has a dovetail groove 35 having a T-shaped cross section and obliquely extending in the axial direction of the die.

Figure 4:
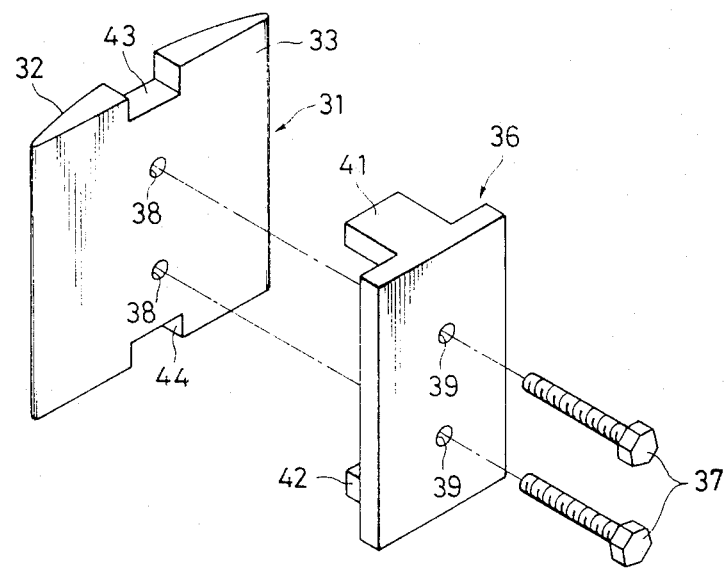
FIG. 4 illustrates a perspective exploded view of an intermediate block and the vicinity thereof.

A dovetail block 36 having a T-shaped cross section as shown in FIG. 4 is slidably fitted in each dovetail groove 35. Each intermediate block 31 has a plurality of loose fit holes 38 in which bolts 37 are loosely fitted. After the bolts 37 are inserted through the loose fit holes 39 and the through holes 39 of the dovetail block 36, the bolts 37 are screwed into the outer ring 21 so that the intermediate block 31 and the dovetail block 36 are removably secured to the truncated-cone-shaped surface 24 of the outer ring 21. The dovetail groove 35 and the dovetail block 36 constitute an oblique coupling 40 for joining the segments 12 and the outer ring 21 to each other. Since the bolts 37 are loosely fitted in the loose fit holes 38, the intermediate block 31 cannot directly be positioned by the bolts 37. However, lugs 41 and 42 provided at both the longitudinal ends of the dovetail block 36 conform to grooves 43 and 44 provided in both the longitudinal ends of the intermediate block 31. Thus, the intermediate block 31 is indirectly positioned through the action of the dovetail block 36. A shim for adjusting the position of the dovetail block 36 is provided between the dovetail block 36 and the intermediate block 31.

The operation of the split vulcanizing die will now be described. When the tire 16 is to be vulcanized by the die, the tire is first put on the lower molding ring 1, and the piston rod 8 then protrudes to move down the upper molding ring 5 toward the lower molding ring 1. The bolster plate 23 is moved down together with the outer ring 21 in the axial direction of the die so that all of the segments 12 are pushed and moved inwards in the radial direction of the die by the wedge action of the slide contact surfaces 33 of the intermediate blocks 31. At that time, since the planar surfaces 19 and the slip contact surfaces 33 are in surface contact with each other by 80% or more of the area of each slip contact surface 33, the segments 12 are smoothly moved while maintaining an unchanged posture. In addition, since almost no shearing force acts to each of the bolts 37 conjoining the intermediate block 31 and the outer ring 21 to each other, the accuracy of the conjoining is kept high. When all the segments 12, are moved to their radially innermost positions in which the segments are in tight contact with the outside circumferential surfaces of the upper and lower molding rings 1 and 5, the downward movement of the bolster plate 23 is stopped. At that time, the upper, the lower and the side molding rings 1, 5 and 11 define the vulcanizing cavity 17 in which the tire 16 is housed.

A gap 51 (FIG. 5), which is 0.05 to 0.2 mm, is defined between the truncated-cone-shaped surface 24 of the outer ring 21 and that 18 of each segment 12 to prevent the truncated-cone-shaped surfaces 18 and 24 from coming into contact with each other when the segment 12 is moved. Prescribed high pressure and temperature are thereafter applied to the tire 16 in the mold to vulcanize it. After the tire 16 is vulcanized, the bolster plate 23 is moved up so that the segments 12 are moved outwards in the radial direction of the die by the action of the dovetail couplings 40, and the upper molding ring 5 is moved up. The split vulcanizing die is thus loosened. The vulcanized tire 16 is then taken out of the die. When the operation has been extensively repeated, intermediate block 31 will wear so that the dimensional accuracy of the die drops. In that case, the worn intermediate block 31 can be easily replaced with a new one by merely loosening the bolts 37.

It is apparent that modifications of this invention may be practiced without departing from the scope thereof.

What is claimed is:

1. A split vulcanizing die comprising: a lower molding ring; an upper molding ring movable relative to said lower molding ring; a side molding ring composed of a plurality of arc-shaped segments movable in the radial direction of said die whereby when all said segments are moved to their radially innermost positions, said side molding ring is placed in tight contact with outside circumferential surfaces of said upper and lower molding rings which move toward each other to define a vulcanizing cavity inside said upper, lower and side molding rings; an outer ring having an inside circumferential truncated-cone-shaped surface and provided outside said side molding ring so that said outer ring can be moved in the axial direction of said die; oblique dovetail couplings which conjoin said segments to said outer ring, said segments having oblique planar surfaces provided on the circumferential outsides thereof; intermediate blocks corresponding to said segments removably attached to the truncated-cone-shaped surface of said outer ring; and the inside surfaces of said intermediate blocks having planar surfaces which are placed in slip contact with planar surfaces on said segments which face said blocks.

2. The die of claim 1 wherein said arc-shaped segments comprise an arc-shaped molding member defining a portion of a molding recess and, a slider having said oblique planar surfaces.

3. The die of claim 2 wherein each slider has a radially outer truncated-cone-shaped and a planar surface which is at the same gradient.

4. The die of claim 3 wherein an intermediate block is positioned between said slider and said outer ring, said intermediate blocks having an outer surface defining a truncated-cone-shaped surface of the same gradient as the truncated-cone-shaped surface of said outer ring and defining a gap therebetween where said surfaces do not touch.

5. The die of claim 1 wherein said dovetail couplings comprise a first element removably mounted in said segment and means to fix said first element to said outer ring.

6. The die of claim 5 wherein each segment comprises a molding member and a slider, said slider having a dovetail groove and said first element slidably fitted into said dovetail groove.

7. The die of claim 6 wherein said intermediate blocks have through holes and said means to fix passes through said through holes into said outer ring.

8. The die of claim 6 wherein said first element comprises an alignment lug and said intermediate block comprises a groove to receive said lug.

9. The die of claim 6 wherein said first element comprises a pair of lugs at ends thereof and said intermediate block comprises a pair of grooves to receive each of said lugs.

* * * * *